United States Patent
Stankwitz et al.

(10) Patent No.: US 7,348,917 B2
(45) Date of Patent: Mar. 25, 2008

(54) SYNTHETIC MULTI-APERTURE RADAR TECHNOLOGY

(75) Inventors: Herbert C. Stankwitz, Clifton, VA (US); Stephen P. Taylor, Ann Arbor, MI (US)

(73) Assignee: Integrity Applications Incorporated, Chantilly, VA (US)

( * ) Notice: Subject to any disclaimer, the term of this patent is extended or adjusted under 35 U.S.C. 154(b) by 291 days.

(21) Appl. No.: 11/339,532

(22) Filed: Jan. 26, 2006

(65) Prior Publication Data

US 2006/0170585 A1    Aug. 3, 2006

Related U.S. Application Data

(60) Provisional application No. 60/667,698, filed on Apr. 4, 2005, provisional application No. 60/647,431, filed on Jan. 28, 2005.

(51) Int. Cl.
*G01S 13/90* (2006.01)
(52) U.S. Cl. .................... 342/25 R; 342/25 F
(58) Field of Classification Search .......... 342/25 R, 342/25 A–25 F, 179, 192, 195, 197
See application file for complete search history.

(56) References Cited

U.S. PATENT DOCUMENTS

| | | | | |
|---|---|---|---|---|
| 4,034,370 A | * | 7/1977 | Mims | 342/25 D |
| 5,686,922 A | * | 11/1997 | Stankwitz et al. | 342/196 |
| 5,745,069 A | * | 4/1998 | Gail | 342/25 F |
| 5,812,082 A | * | 9/1998 | Moreira et al. | 342/25 A |
| 5,854,602 A | * | 12/1998 | Stankwitz et al. | 342/25 F |
| 6,750,809 B1 | * | 6/2004 | Cho et al. | 342/129 |
| 6,965,341 B1 | * | 11/2005 | Cho et al. | 342/25 A |
| 2006/0170585 A1 | * | 8/2006 | Stankwitz et al. | 342/25 A |

FOREIGN PATENT DOCUMENTS

EP    514853 A2 *    11/1992

* cited by examiner

*Primary Examiner*—John B Sotomayor
(74) *Attorney, Agent, or Firm*—Knobbe, Martens, Olson & Bear, LLP

(57) ABSTRACT

Systems and methods of improving synthetic aperture radar (SAR) system are disclosed. In particular, an example system includes a radar signal radiator configured to transmit radar signal pulses that have a partial bandwidth at a regular interval. The partial bandwidth is a portion of a full bandwidth that said radar signal radiator is designed to generate. The example system also includes a receiver configured to receive radar signals returned in response to said transmitted radar signal pulses, and a processor configured to extrapolate said received signals to said full bandwidth, to thereby create high resolution SAR images.

14 Claims, 7 Drawing Sheets

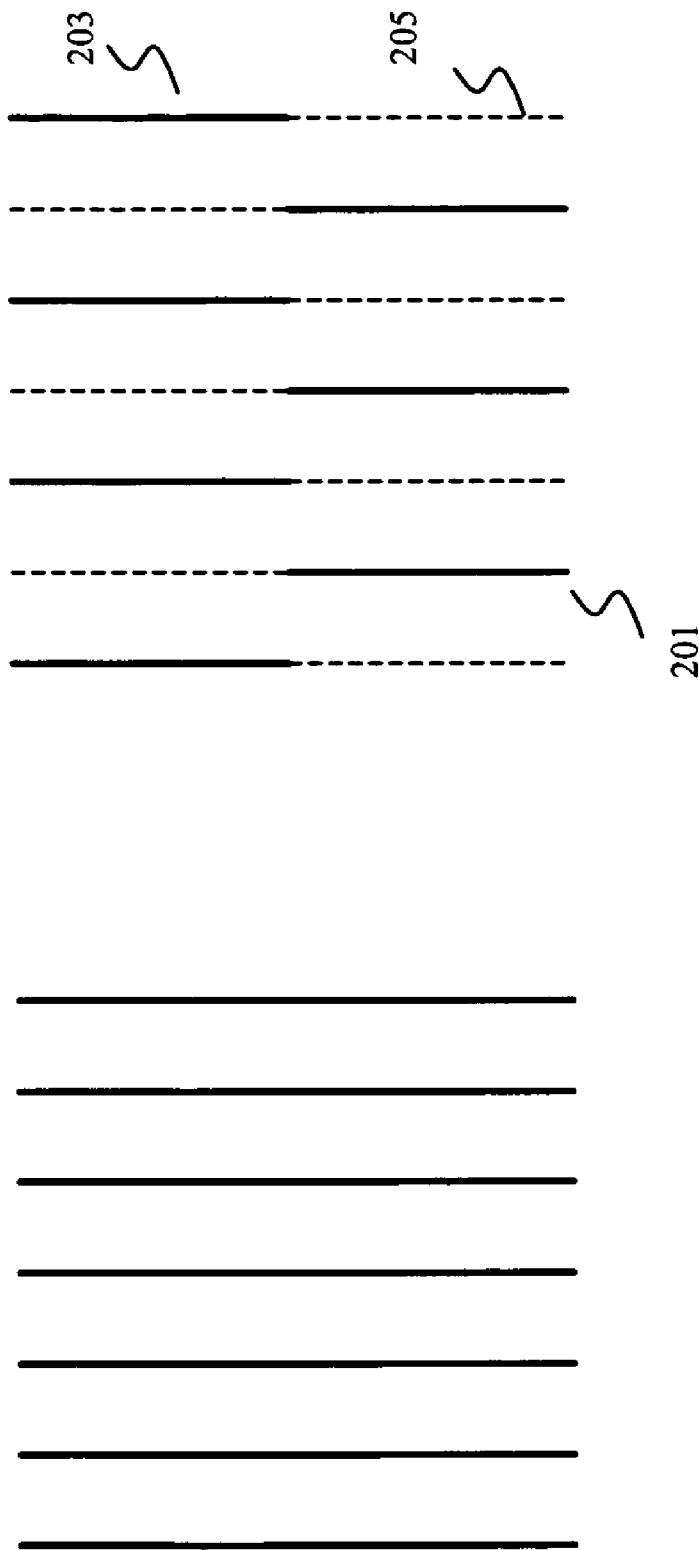

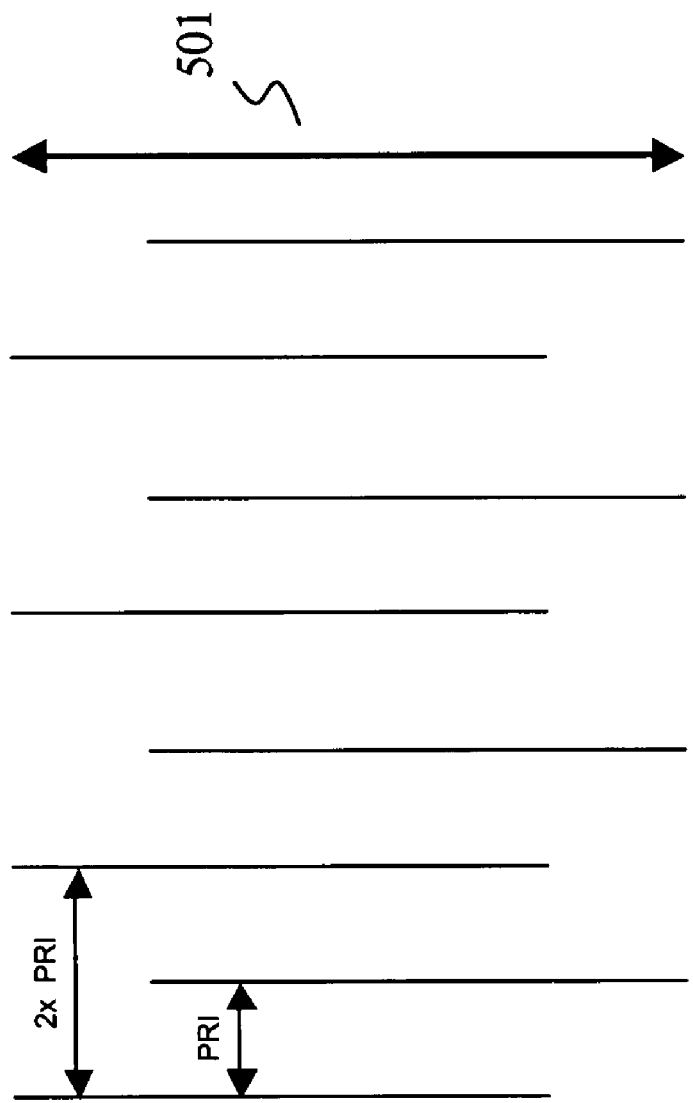

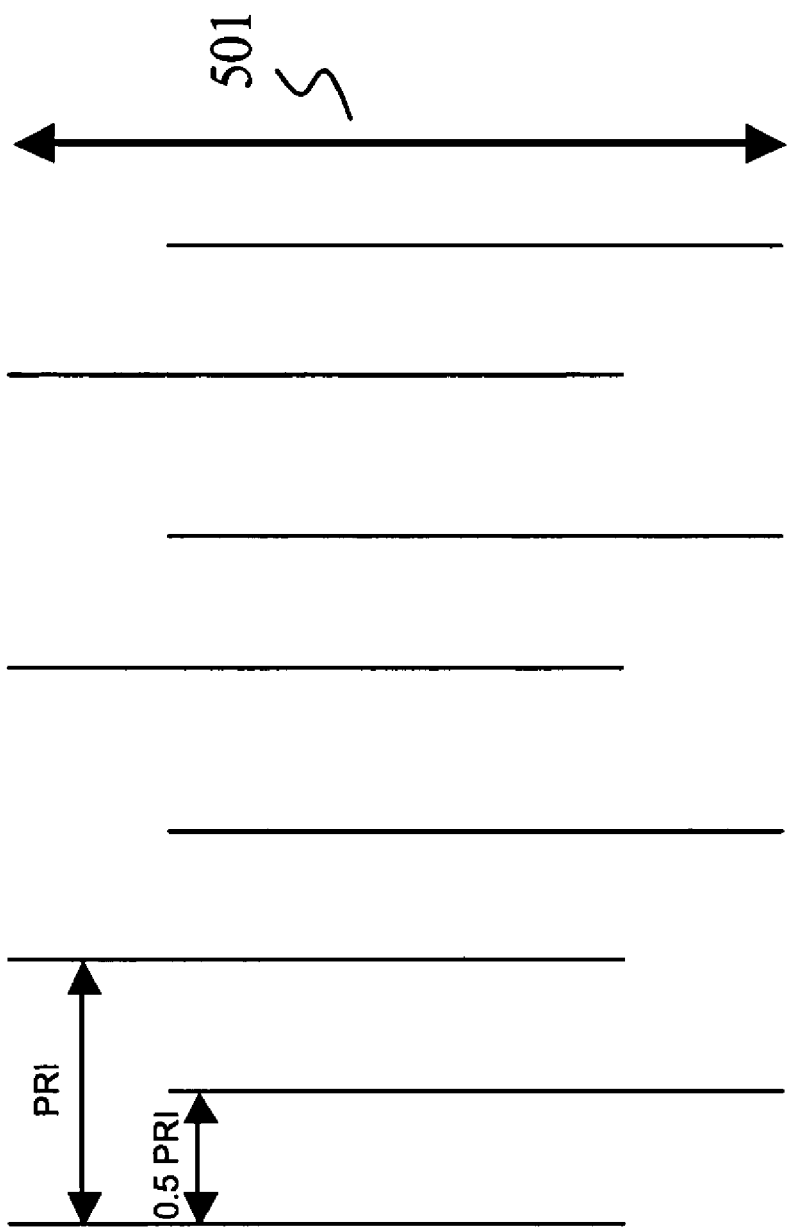

SYNTHETIC MULTI-APERTURE RADAR TECHNOLOGY

RELATED APPLICATIONS

This application claims the priorities of U.S. Provisional Application 60/647,431, filed Jan. 28, 2005, and 60/667,698 filed on Apr. 4, 2005, which are incorporated herein by reference in their entirety.

FIELD OF THE INVENTION

The present invention relates to systems and methods of increasing swath and/or reducing the required antenna size without increasing ambiguities for synthetic aperture radar systems.

BACKGROUND OF THE INVENTION

Synthetic aperture radar, or SAR, has emerged as a valuable remote sensing tool. SAR is based on synthesizing an effectively long antenna array by electronic signal processing devices rather than by the use of a physically long antenna array. With SAR, it is possible to synthesize an antenna many times longer than any physically large antenna that could be conveniently transported. As a result, for an antenna of given physical dimensions, SAR has an effective antenna beam width that is many times narrower than the beam width that is attainable with a conventional radar.

An example of SAR is a pulse-Doppler SAR, which has a radiating element translated along a trajectory (e.g., mounted on an aircraft and transported along a predetermined flight path) to take up sequential sampling positions (e.g., locations along the synthetic antenna). At each of these sampling points, the radiating element transmits a radar signal (e.g., a radar pulse signal), and the pulse-Doppler SAR collects and stores returned signal data (i.e., the amplitude and the phase data of the radar signals received in response to a transmission). After the radiating element has traversed a distance substantially equivalent to the length of the synthetic array, the stored signal data contain information that can be manipulated to generate signal data that would have been received by the elements of a conventional linear array antenna (i.e., a non-SAR antenna).

The size of the unambiguous ground patch that can be imaged by the pulse-Doppler SAR is constrained in azimuth by the maximum frequency of repeating the pulses (also known as the maximum pulse repetition frequency, the "PRF"). In other words, the PRF should be high enough to sample unambiguously the maximum Doppler frequency within the azimuth mainbeam illumination pattern. Similarly, the range swath is constrained by the maximum pulse repetition interval (PRI), i.e., the time interval between pulses. The PRI should be large enough to preclude ambiguous returns from outside of the antenna mainbeam illumination pattern in the range direction.

Increasing the PRF allows for a wider unambiguous azimuth swath to be imaged; however, since PRI is the inverse of PRF, increasing the PRF would decrease the unambiguous range swath. Hence, while the area of the unambiguous patch on the ground is largely independent of the PRF/PRI selected, the length (range)-to-width (azimuth) ratio of the patch is directly affected by the selection of PRF. Since the antenna mainbeam is used to filter ambiguous returns in SAR systems, there is a direct relationship between the required physical minimum antenna area and shape, and the desired unambiguous ground patch area and shape. In general, the antenna area is set by the unambiguous patch size on the ground. However, a high PRF would require an antenna that is taller (in range) than it is wide (in azimuth), and vice versa for a low PRF.

In order to increase the maximum size of the unambiguous ground patch the collection platform could simultaneously operate, in effect, more than one radar receiver and/or transmitter. The Canadian Space Agency's Radarsat-2, for example, implements an approach for reducing the required receive antenna size (thereby improving the resolution, which is proportional to antenna width in strip mode) and maintaining an unambiguous collected swath in the Ultra-Fine mode by receiving simultaneously from two antenna phase-centers. However, the overall antenna size is not reduced due to the need for two displaced receive apertures. Hence, there is a need to resolve ambiguities beyond the traditionally recognized physical limitations described above, to thereby reduce the overall antenna size, weight, and complexity, or to increase the collected swath without increasing ambiguities.

SUMMARY OF THE INVENTION

Embodiments of the present inventions relate to new systems and methods for reducing the overall antenna size or increasing the swath without increasing ambiguities in SAR systems.

In particular, various embodiments of the present invention relate to systems and methods of improving synthetic aperture radar (SAR) system are disclosed. In particular, an example system includes a radar signal radiator configured to transmit interleaved sets of radar signal pulses, where each set of radar signal pulses contributes a portion of the total bandwidth required for the SAR image. The aggregate bandwidth of the interleaved pulses span the full bandwidth required for the high resolution SAR image. The partial bandwidth is a portion of a full bandwidth that said radar signal radiator is designed to generate. The example system also includes a receiver configured to receive radar signals returned in response to said transmitted radar signal pulses, and a processor configured to extrapolate said received signals to said full bandwidth, to thereby create high resolution SAR images.

An example method includes the act of transmitting radar signal pulses having a partial bandwidth at a regular interval. The partial bandwidth is a portion of a full bandwidth that said SAR is designed to generate. The method further includes the acts of receiving radar signals returned in response to said transmitted radar signal pulses, and extrapolating said received signals to said full bandwidth, to thereby create improved SAR images.

BRIEF DESCRIPTION OF THE DRAWINGS

For a fuller understanding of the nature and objects of the present invention, reference should be made to the following detailed description taken in connection with the accompanying drawings in which the same reference numerals are used to indicate the same or similar parts, wherein

FIG. 2a is a graph illustrating a full bandwidth pulse train;

FIG. 2b is a graph illustrating two interleaved partial bandwidth pulse trains;

FIG. 4a is a SAR image taken by a SAR system;

FIG. 4c is a SAR image created by removing portions of signal data of FIG. 4a;

FIG. 4b is a SAR image created by applying various embodiments of the present invention on FIG. 4b; and FIGS. 5-7 are graphs illustrating various embodiments of partial bandwidth pulse trains of various embodiments of the present invention.

DETAILED DESCRIPTION OF PREFERRED EMBODIMENTS

Figure 1:
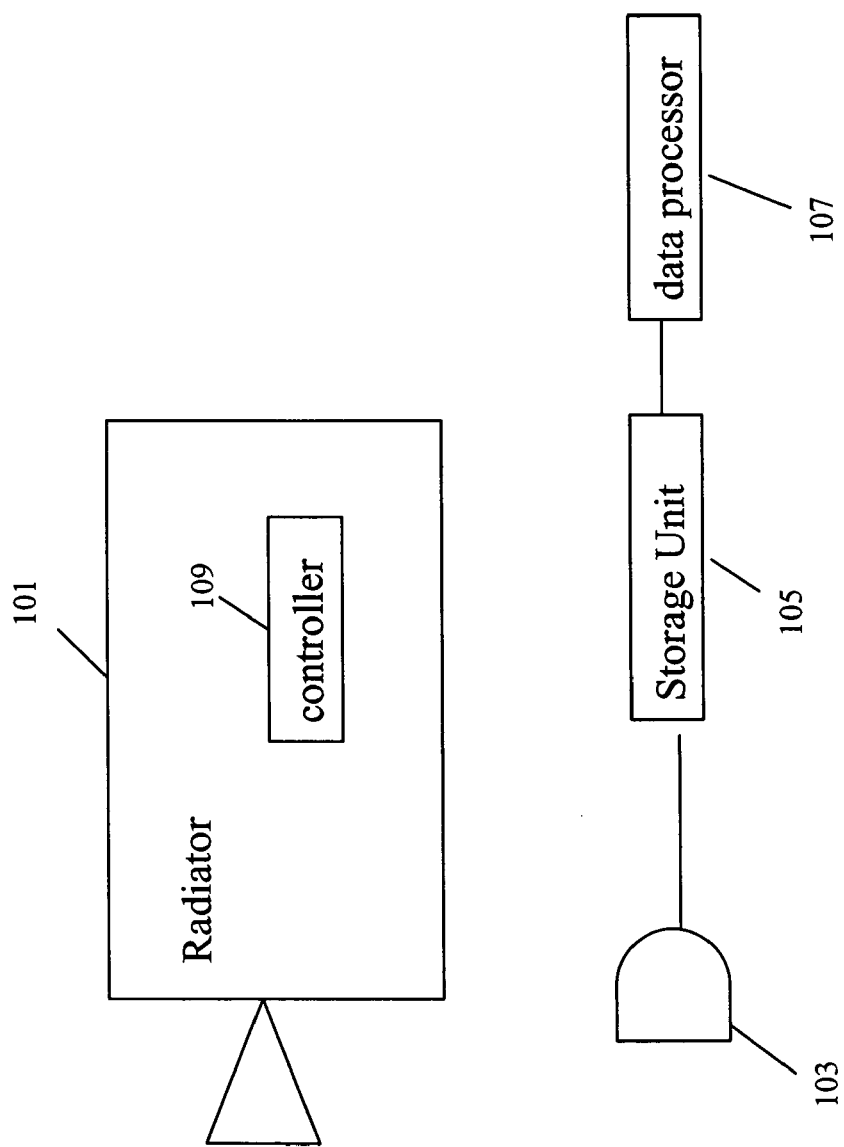
FIG. 1 is a simplified schematic diagram of an example SAR system, on which various of embodiments of the present invention can be implemented.

Embodiments of the present invention relate to systems and methods for reducing the overall antenna size without increasing the ambiguities or reducing the swath in SAR systems. Alternatively, the embodiments of the present invention relate to systems and methods for increasing the swath without increasing the ambiguities or increasing the antenna size in SAR systems. FIG. 1 shows a simplified block diagram illustrating a SAR system of various embodiments of the present invention, which can be implemented as a single-phase center SAR. Various components of present invention include radiator 101, receiver 103, storage unit 105, and data processor 107. On the transmission side, radiator 101 (which can include controller 109) is configured to transmit radar pulses, and controller 109 is configured to control the pulses (e.g., the shape, timing, bandwidth, steering, and/or power of the pulses). On the receiving side, receiver 103 is coupled to antenna (not shown) and is configured to receive and collect return radar signals. The collected data is stored on storage unit 107. Data processor 109 is configured to generate images based on the stored data.

FIG. 2b illustrates an example pulse pattern transmitted by radiator 101. The overall pulse pattern is composed of two sets of half-bandwidth coherent pulses that alternate between the lower half 201 and upper half 203 of the available transmit bandwidth, as indicated in FIG. 2b by the solid lines. The upper half of FIG. 2b represents a series of half-bandwidth pulses at half the nominal PRF, which are therefore ambiguous in azimuth, but unambiguous for twice the extent in range compared with the nominal PRF. The pulses comprising the half bandwidth represented by the lower half of FIG. 2b exhibits similar characteristics.

In various embodiments of the present invention, the partial bandwidth pulses depicted as the upper and lower half solid lines in FIG. 2b are extrapolated to full bandwidth (e.g., as shown in FIG. 2a) via bandwidth extrapolation by data processor 109. The staggered pattern of the upper bandwidth pulses relative to the lower bandwidth means that extrapolated (dashed lines 205 in FIG. 2b) portions from the upper bandwidth interleave with the lower bandwidth data, and vice versa. Therefore, the effective PRF is increased and azimuth ambiguities can potentially be resolved, while the effective range swath has been increased by up to a factor of two. The effective bandwidth is increased as well, thereby achieving the bandwidth required for a high resolution SAR image. This feature of suppressing azimuth ambiguities while retaining the larger range swath is one of many benefits of various embodiments of the present invention. Hence, embodiments of the present invention reduce the overall antenna size without increasing the ambiguities or reducing the swath in SAR systems. Alternatively, the embodiments of the present invention increase the range swath without increasing the ambiguities or increasing the antenna size in SAR systems, but without the increase in antenna weight and complexity entailed by multichannel SAR systems like Radarsat.

Figure 3A:
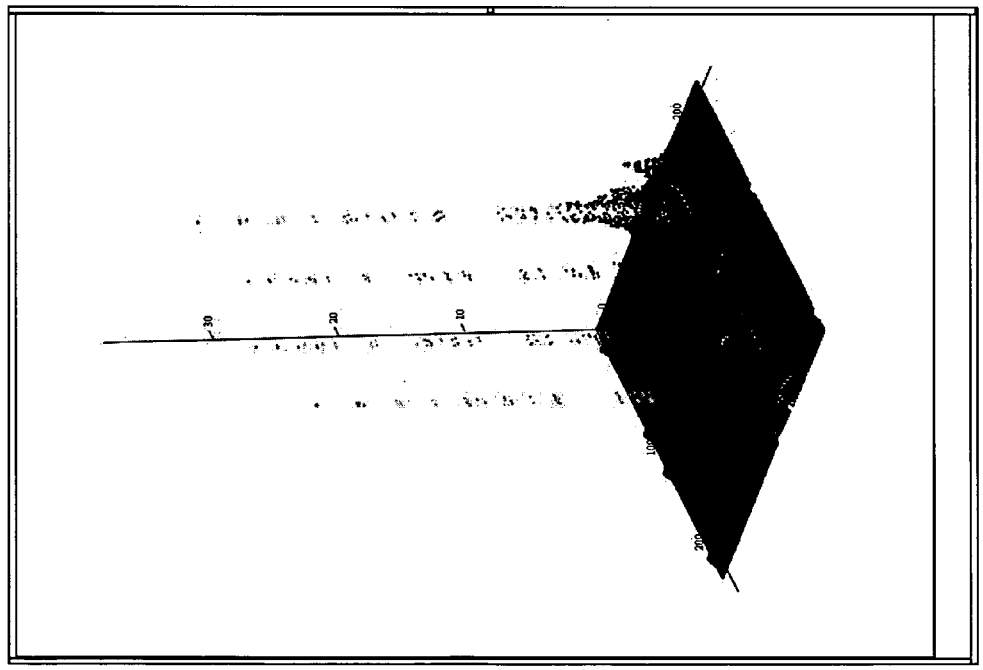
FIG. 3a is a graph illustrating a two point return image with ambiguities.
Figure 3B:
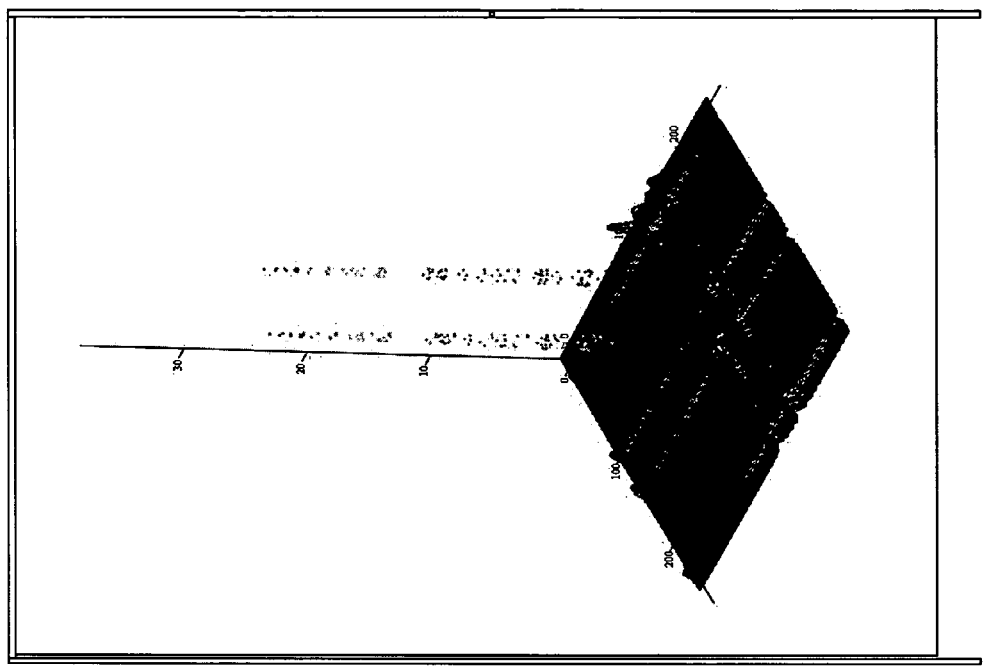
FIG. 3b is a graph illustrating a two point return image with ambiguities removed using various embodiments of the present invention.

FIG. 3a graphically illustrates simulated results that would have been obtained using a conventional SAR from a pair of point targets (e.g., two features on a patch of the ground that return high amplitude signal data). In particular, FIG. 3a shows an ambiguous image with the two ambiguous returns clearly visible along with the two actual point returns. FIG. 3a graphically illustrates simulated results obtained when various techniques of the present invention are applied. This yields an image that shows (as in FIG. 3b) that the ambiguities have been suppressed.

Figures 4A, 4B, 4C:
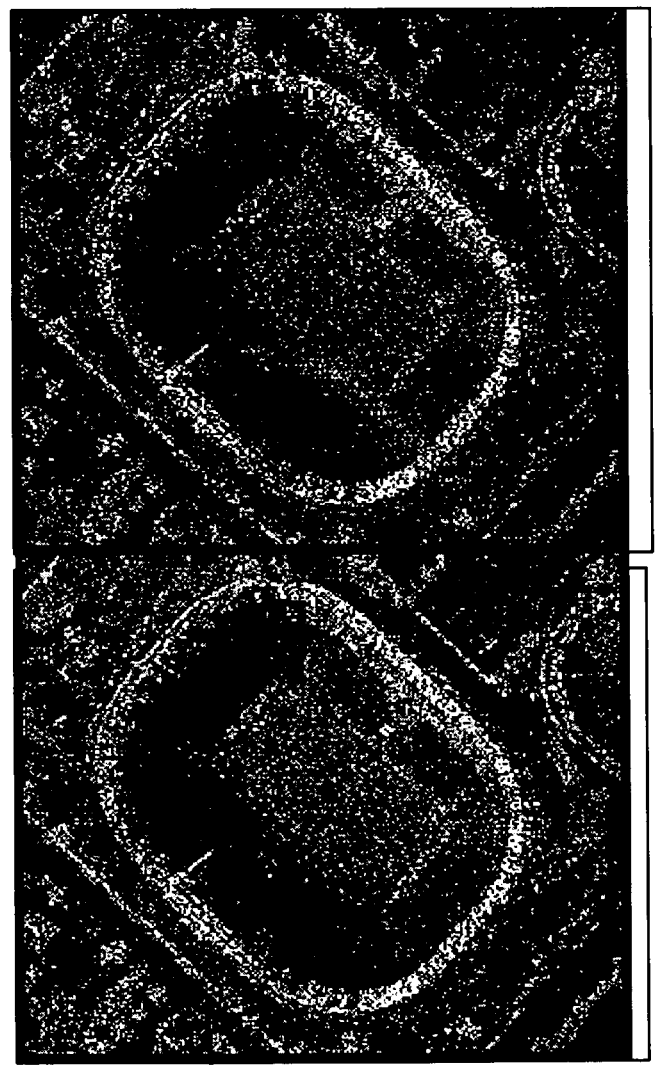

Although the above example shows a simple case of point targets, various embodiments of the present invention can be applied to a real-world ground mapping SAR by extrapolating complex clutter-like returns, and by extrapolating azimuth-ambiguous coherent data. For instance, FIGS. 4a-c show results of applying various techniques of the present invention to a simulated sparse aperture of a complex real-world image. FIG. 4a shows the original, filled aperture SAR image of the University of Michigan football stadium. FIG. 4c is the resultant image after removal of portions of the signal data (e.g., removing signal data corresponding to the dotted lines in FIG. 2b). Finally, FIG. 4b shows the result of applying various techniques of the present invention to the signal data of FIG. 4c. Various artifacts are clearly visible in the lower portion of the image in FIG. 4c but not in FIG. 4b, which demonstrates that various embodiments of the present invention improve noise suppression and improve resolving ambiguities even for complex SAR images.

Figure 7:
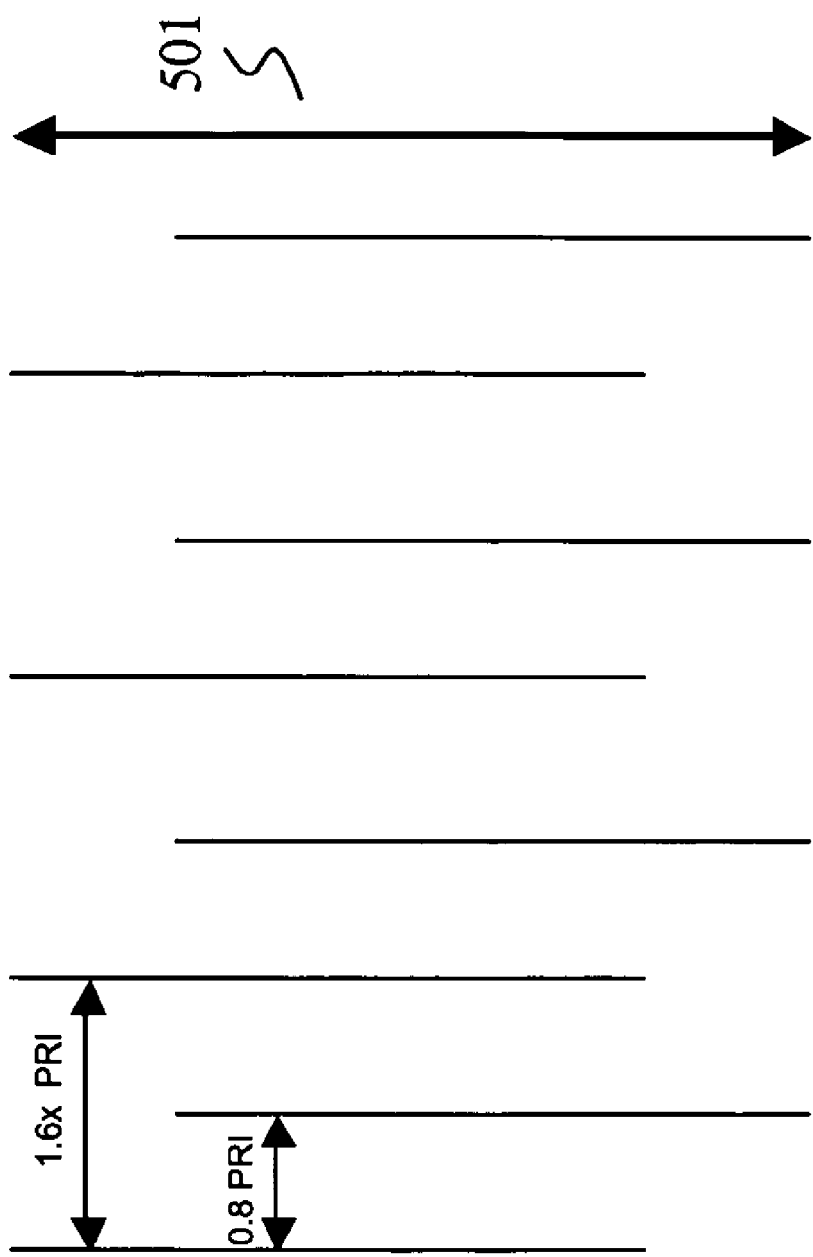

In addition to the pulse pattern depicted in FIG. 2b, other pulse patterns are contemplated within various embodiments of the present invention. FIGS. 5-7 provide examples of other pulse patterns. In particular, FIG. 5 illustrates an example pulse pattern having a series of partial bandwidth coherent pulses (e.g., at 60%-80% bandwidth, at 50%-70% bandwidth, at 51%-90% bandwidth, or at 50%-90% bandwidth) that alternate between the lower and upper portions of the available transmit bandwidth, as indicated in FIG. 5 by the solid lines. Here, the extent of full bandwidth is illustrated by 501. Similar with the example described above in connection with FIG. 2b, in this example the partial returns can be restored to full bandwidth via bandwidth extrapolation. Moreover, the interval between the pulses can also be adjusted. For instance, in FIG. 5, each pulse can be transmitted at 1.0 of the PRI. Also, in another example shown in FIG. 6, each pulse can be transmitted at 0.5 of the PRI. In yet another example shown in FIG. 7, each pulse can be transmitted at 0.8 of the PRI.

Extrapolation of Partial Bandwidth Pulse Data

This section describes specific examples for techniques of extrapolating the partial bandwidth data mentioned above. First, by way of providing general background information, instances of irregularly shaped or sparse apertures are encountered for real and synthesized 2-D antenna patterns, for both active and passive microwave systems. Electronically steerable arrays, conformal arrays, synthetic aperture radar (SAR), and thinned-array, synthetic aperture microwave radiometers are some examples for which irregular support of Fourier data can occur. Impulse response sidelobe peak levels and integrated sidelobe power for non-rectangular, non-circular Fourier data samples can be quite large, requiring the application of sidelobe control.

Suppression of finite-aperture sidelobes in coherent imaging systems has traditionally been accomplished using tapered window functions applied to the signal data. Non-linear apodization (NLA) methods are more effective in coherent radar applications for suppressing sidelobe artifacts that are a result of finite-aperture data support. These non-linear techniques achieve increased suppression of sidelobes without broadening the mainlobe of the impulse response, a shortcoming of traditional linear windowing for sidelobe control. Non-linear apodization (NLA) techniques can also serve as engines for effective superresolution and bandwidth extrapolation of coherent data for filling sparse apertures. An example of NLA is disclosed in U.S. Pat. No. 5,854,602, which is incorporated by reference in its entirety.

Embodiments of the present invention adapt NLA to applications for which the Fourier data samples are of an irregular shape, which include: 1) direct application of NLA developed for a rectangular aperture to an irregular data support shape, based on the smallest circumscribed rectangle containing the irregular data support; and, 2) use the superresolution properties of NLA as a data extrapolation method to regularize a sparse aperture (i.e., partial bandwidth data described above). A combination of these two approaches ultimately yields maximum suppression of sidelobes while preserving the mainlobe resolution for irregular shapes.

Non-linear apodization (windowing) methods such as Spatially Variant Apodization (SVA) have proven effective in Synthetic Aperture Radar (SAR) applications where the collected Fourier data samples have rectangular support. Classic windowing functions such as Taylor, Hamming, Blackman, etc., applied to SAR signal data for suppression of impulse-response (IPR) sidelobes have the undesired effect of broadening the IPR mainlobe, thereby degrading the resolution of the resultant image. The widely used Hanning (cosine-on-pedestal) window, for example, achieves low sidelobes at the cost of doubling the mainlobe width relative to uniform, unweighted signal data. SVA applied to SAR data provides improved suppression of IPR sidelobes, without the attendant mainlobe broadening of classical windowing techniques. This unique property of SVA is achieved through the selection of a particular signa domain windowing function for each pixel in the SAR image, i.e. the signal-domain windowing function varies, pixel by pixel, across the SAR image. The selection of the proper windowing function for a particular pixel is based on properties of neighboring image pixels, in the immediate vicinity, hence the non-linear nature of SVA.

NLA techniques also can serve as the basis for superresolution/bandwidth-extrapolation algorithms. SVA, for example, is the basis for the superresolution algorithm, an FFT-based spectral estimator of order Nlog(N) computational complexity. This enables Super-SVA to be more computationally efficient than other superresolution techniques and spectral estimators that require inversion of a covariance matrix, generally with N-cubed order computational complexity. Furthermore, Super-SVA is applied to every pixel in the same manner, without the threshold decision logic often found in other superresolution approaches, which can produce spurious artifacts. Prior results show that Super-SVA can extrapolate a 2-D data set with rectangular support, or can be used to interpolate across a rectangular region of missing data within a 2-D rectangular set of collected SAR data.

Moreover, non-linear apodization methods can be applied to control sidelobes and enhance resolution for synthesized-aperture radiometry, in particular the Y-type radiometer. Y-type radiometry has been used for many years in probably the most familiar application: the Very Large Array (VLA) radio telescope at the National Radio Astronomy Observatory in Socorro, N. Mex. This and other planned radar systems employ a thinned array of radiometer elements arranged along three equal length arms, equally separated in angle by 120-degrees in the shape of a 'Y'.

A larger effective aperture with greater fill can be synthesized from the sparse Y-shaped element arrays by performing a complete set of pair-wise correlations between each of the radiometer elements on each of the arms. This complete set of pair-wise correlations, fundamental to Y-type radiometer aperture synthesis, is called the visibility function. The Y-type radiometer has a hexagonal, star-shaped visibility function of (u, v) samples, which is the Fourier transform of the radiometric "image."

However, the improvement in sidelobe performance comes with the attendant mainlobe broadening typical of linear windowing approaches. Sidelobe reduction without mainlobe broadening is critical for the GeoSTAR application: GeoSTAR must maintain 50 km ground resolution across the Earth disc from geosynchronous orbit (35,800 km), while satisfying size, weight, power, and structural mechanical tolerance requirements to maintain phase coherence between receiver elements. Nonlinear apodization methods provide significant margin for the spacecraft design, and increased instrument performance relative to classical windowing functions adapted to the irregular, star-shaped hexagonal visibility function.

Various embodiments and advantages of the present invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to falling within the scope of the invention. While the foregoing invention has been described in detail by way of illustration and example of various embodiments, numerous modifications, substitutions, and alterations are possible without departing from the scope of the invention defined in the following claims.

What is claimed is:

1. A synthetic aperture radar (SAR) system comprising:
    a radar signal radiator configured to transmit radar signal pulses having a partial bandwidth at a regular interval, wherein said partial bandwidth is a portion of a full bandwidth that said radar signal radiator is designed to generate,
    a receiver configured to receive radar signals returned in response to said transmitted radar signal pulses, and
    a processor configured to extrapolate said received signals to said full bandwidth, to thereby create high resolution SAR images.

2. The system of claim 1, wherein said radar signal radiator is further configured to transmit said radar signal pulses at 50% of said full bandwidth.

3. The system of claim 1, wherein said radar signal radiator is further configured to transmit said radar signal pulses at 51% to 90% of said full bandwidth.

4. The system of claim 1, wherein said radar signal radiator is further configured to transmit a first pulse and a second pulse in an alternating pattern, wherein the bandwidth of said first pulse is at a lower spectrum portion of said full bandwidth, and the bandwidth of said second pulse is at an upper spectrum portion of said full bandwidth.

5. The system of claim 1, wherein said regular interval is 100% of a pulse repetition interval which said radar signal radiator uses to form unambiguous high resolution SAR imagery.

6. The system of claim 1, wherein said regular interval is 50% of a pulse repetition interval which said radar signal radiator uses to form unambiguous high resolution SAR imagery.

7. The system of claim 1, wherein said radiator and receiver are implemented on a pulse-Doppler SAR.

8. The system of claim 1, wherein said processor is disposed at a remote location from said radiator and receiver.

9. A method of reducing ambiguities in radar images collected by synthetic aperture radar (SAR) systems, said method comprising:
   transmitting radar signal pulses having a partial bandwidth at a regular interval, wherein said partial bandwidth is a portion of a full bandwidth required for a high resolution SAR image,
   receiving radar signals returned in response to said transmitted radar signal pulses, and
   extrapolating said received signals to said full bandwidth, to thereby reduce ambiguities in the radar images.

10. The method of claim 9 further comprising:
    transmitting said radar signal pulses at 50% of said full bandwidth.

11. The method of claim 9 further comprising:
    transmitting said radar signal pulses at 50% to 90% of said full bandwidth.

12. The method of claim 9 further comprising:
    transmitting a first pulse train and a second pulse train in an alternating pattern, wherein the bandwidth of said first pulse train is at a lower spectrum portion of said full bandwidth, and the bandwidth of said second pulse train is at an upper spectrum portion of said full bandwidth, and the aggregate bandwidth of the two pulse trains covers the bandwidth required for a high resolution SAR image.

13. The method of claim 9, wherein said regular interval is 100% of a pulse repetition interval which said SAR uses to form unambiguous high resolution SAR imagery.

14. The method of claim 9, wherein said regular interval is 50% of a pulse repetition interval which said SAR uses to form unambiguous high resolution SAR imagery.

* * * * *